US010828213B1

(12) United States Patent
Ludovici et al.

(10) Patent No.: US 10,828,213 B1
(45) Date of Patent: Nov. 10, 2020

(54) FOLDABLE TILTABLE WHEELCHAIR AND FRAME THEREFOR

(71) Applicant: Ki Mobility LLC, Stevens Point, WI (US)

(72) Inventors: Alan Ludovici, Stevens Point, WI (US); Thomas J. Whelan, Stevens Point, WI (US); Richard E. Schneider, Cheyenne, WY (US); Murray G. Slagerman, Rosser (CA)

(73) Assignee: Ki Mobility, LLC, Stevens Point, WI (US)

(*) Notice: Subject to any disclaimer, the term of this patent is extended or adjusted under 35 U.S.C. 154(b) by 0 days.

(21) Appl. No.: 15/644,472

(22) Filed: Jul. 7, 2017

(51) Int. Cl.
*B62B 7/00* (2006.01)
*A61G 5/10* (2006.01)

(52) U.S. Cl.
CPC ......... *A61G 5/1075* (2013.01); *A61G 5/1081* (2016.11)

(58) Field of Classification Search
CPC ...... A61G 5/1075; A61G 5/1081; A61G 5/00; A61G 5/10; A61G 5/08; A61G 5/0816; A61G 5/0825; A61G 5/1054; A61G 5/0858; A61G 5/107; A61G 5/085
See application file for complete search history.

(56) References Cited

U.S. PATENT DOCUMENTS

| | | | | | |
|---|---|---|---|---|---|
| 4,477,098 | A * | 10/1984 | Minnebraker | A61G 5/00 | 280/250.1 |
| 5,020,816 | A * | 6/1991 | Mulholland | A61G 5/08 | 280/250.1 |
| 5,076,390 | A * | 12/1991 | Haskins | A61G 5/08 | 280/250.1 |
| 5,076,602 | A * | 12/1991 | Robertson | A61G 5/00 | 280/250.1 |
| 5,154,438 | A * | 10/1992 | Barclay | A61G 5/00 | 280/250.1 |
| 5,421,598 | A * | 6/1995 | Robertson | A61G 5/00 | 280/250.1 |
| 5,727,802 | A * | 3/1998 | Garven, Jr. | A61G 5/08 | 280/250.1 |
| 5,782,483 | A * | 7/1998 | Rogers | A61G 5/1054 | 280/642 |
| 5,957,474 | A | 9/1999 | Mundy et al. | | |
| 6,352,275 | B1 * | 3/2002 | Lindenkamp | A61G 5/08 | 280/250.1 |
| 6,447,064 | B1 | 9/2002 | Mundy et al. | | |
| 6,572,133 | B1 * | 6/2003 | Stevens | A61G 5/08 | 280/250.1 |

(Continued)

OTHER PUBLICATIONS

Promedicare, Adacta Liga Brochure, May 2012.
Mobility Plus, MP Tilt Chair, Date Unknown.

*Primary Examiner* — James M Dolak
(74) *Attorney, Agent, or Firm* — Thedford I. Hitaffer; Hitaffer & Hitaffer, PLLC

(57) ABSTRACT

A foldable wheelchair comprises a plurality of width-adjustable hinged foldable cross-members connected to side frames to support a pivotable tiltable seat frame. The seat frame angle is operably controlled by use of gas springs that can be configured to support users of varying weight. The wheelchair is further configured to control lateral stability of the seat frame. The seat frame cooperates with a forward positioned pivot that maintains the user's knees in a position relative to the ground. Wheel adjustments allow for a range of seat height.

34 Claims, 7 Drawing Sheets

(56) References Cited

U.S. PATENT DOCUMENTS

| | | | | |
|---|---|---|---|---|
| 6,705,629 | B2 * | 3/2004 | Post | A61G 5/00 280/250.1 |
| 6,834,871 | B2 * | 12/2004 | Chen | A61G 5/00 280/304.1 |
| 6,938,911 | B1 * | 9/2005 | Shyu | A61G 5/08 280/250.1 |
| 7,243,935 | B2 * | 7/2007 | Beumer | A61G 5/107 280/250.1 |
| 7,717,210 | B2 * | 5/2010 | Mahy | A61G 5/046 180/209 |
| 7,784,815 | B2 * | 8/2010 | Porcheron | A61G 5/128 280/47.38 |
| 7,845,665 | B2 * | 12/2010 | Borisoff | A61G 5/02 280/250.1 |
| 7,871,094 | B2 | 1/2011 | Balcom et al. | |
| 7,988,171 | B2 | 8/2011 | Chong | |
| 8,132,823 | B2 | 3/2012 | Balcom et al. | |
| 8,256,785 | B2 * | 9/2012 | Knopf | A61G 5/1059 280/250.1 |
| 8,336,898 | B2 | 12/2012 | Balcom et al. | |
| 8,419,047 | B2 | 4/2013 | Chen | |
| 8,424,896 | B2 * | 4/2013 | Balcom | A61G 5/1075 280/250.1 |
| 8,454,048 | B1 | 6/2013 | Regan et al. | |
| 8,511,699 | B2 | 8/2013 | Balcom et al. | |
| 8,579,315 | B2 | 11/2013 | Balcom et al. | |
| 9,358,164 | B2 * | 6/2016 | Brenner | A61G 5/0891 |
| 9,375,370 | B2 | 6/2016 | Horacek | |
| 9,408,763 | B2 * | 8/2016 | Purdue | A61G 5/1075 |
| 9,603,762 | B2 * | 3/2017 | Bekoscke | A61G 5/043 |
| 9,629,763 | B2 * | 4/2017 | Thompson | A61G 5/1013 |
| 9,642,756 | B2 | 5/2017 | Lauret et al. | |
| 9,829,032 | B2 * | 11/2017 | Hermes | A61G 5/1062 |
| 10,052,245 | B2 * | 8/2018 | He | A61G 5/128 |
| 10,064,769 | B2 * | 9/2018 | Thompson | A61G 5/08 |
| 10,123,922 | B2 * | 11/2018 | Gingras | A61G 5/10 |
| 10,188,565 | B2 * | 1/2019 | Ferniany | A61G 5/1056 |
| 10,238,556 | B1 * | 3/2019 | Slagerman | A61G 5/1059 |
| 10,265,229 | B2 * | 4/2019 | Bekoscke | A61G 5/045 |
| 10,314,751 | B2 * | 6/2019 | Frei | A61G 5/1067 |
| 10,342,721 | B2 * | 7/2019 | Itano | A61G 5/128 |
| 10,363,179 | B2 * | 7/2019 | Itano | A61G 5/10 |
| 10,413,460 | B2 * | 9/2019 | Itano | A61G 5/0825 |
| 10,426,677 | B2 * | 10/2019 | Ferniany | A61G 5/121 |
| 10,441,485 | B2 * | 10/2019 | Lefkowicz | A61G 5/104 |
| 10,524,970 | B2 * | 1/2020 | Dick | A61G 5/1064 |
| 10,548,785 | B2 * | 2/2020 | Vermij | A61G 5/1051 |
| 10,624,803 | B2 * | 4/2020 | Parker | A61G 5/1075 |
| 10,667,967 | B2 * | 6/2020 | Horacek | A61G 5/08 |
| 10,667,968 | B2 * | 6/2020 | Ueda | A61G 5/0825 |
| 10,667,969 | B2 * | 6/2020 | Farricielli | A61G 5/1062 |
| 2003/0230868 | A1 | 12/2003 | Beumer | |
| 2015/0137548 | A1 | 5/2015 | Purdue et al. | |
| 2015/0245963 | A1 | 9/2015 | Laurel et al. | |

* cited by examiner

FOLDABLE TILTABLE WHEELCHAIR AND FRAME THEREFOR

BACKGROUND OF THE INVENTION

This invention relates in general to wheelchairs and more particularly to foldable, tiltable wheelchairs, and frames therefor.

Tiltable wheelchairs are used in a wide range of mobility applications and while the state of the art in pediatric wheelchairs includes a range of foldable frame options, the adult wheelchair market generally allows only use of non-foldable rigid frames to handle increased weight capacities. The increased size of the non-foldable frame for storage reduces the capability for use in transport in a personal vehicle and public transportation, which can limit the suitability of use for many users. In addition, the space needed for storage of a non-foldable wheelchair in the home or a long-term care facility can hinder suitability for use in areas with limited floor space, which is often the case in many healthcare facilities.

While many users would benefit from weight-shifting characteristics of a tiltable seat, the traditional cross-brace of a foldable wheelchair with no seat tilt capability is often prescribed for needs of transport and storage. There is a need for a foldable, tiltable frame for adult weight capacity wheelchairs.

SUMMARY OF THE INVENTION

This invention relates to a foldable wheelchair comprising a plurality of width-adjustable hinged foldable cross-members connected to side frames to support a pivotable, tiltable seat frame. The seat frame angle is controlled by use of gas springs that can be configured to support users of varying weight. The wheelchair is further configured to control lateral stability of the seat frame. The seat frame cooperates with a forward-positioned pivot that maintains the user's knees in a position relative to the ground. Wheel adjustments allow for a range of seat height.

The invention comprises width-adjustable, horizontal foldable cross-braces with a center pivot point that allows the side frames to fold compactly while allowing clearance of a front pivotable seat frame. The cross-braces are mounted to the side frames of the wheelchair as well as to the rear section of the tiltable seat frame, which is an innovation that provides a rigid seat frame to allow use of a seat sling that will allow the frame to fold without removal of a solid seat surface.

The need to allow a user to use foot-propulsion requires a wide range of seat heights that can be established to suit the leg length of the user. To maintain seat-to-floor geometry on a tiltable seat frame, a front pivot point for the seat is needed so as not to raise the user's feet. This front pivot position for the seat creates a long seat frame that is pivotally connected to the supporting gas springs to create a variable length linkage and provide a force to assist in controlling and tilting the seat when occupied. A lateral support comprises the gas spring linkage to reduce seat frame flexure from the side frames and greatly increase the stability of the seat frame.

The gas spring linkage is coupled to the base frame and an end mount position of the gas spring can be adjusted to affect the line of force exerted by the gas spring to account for varying weights of users to be lifted in the seat. A more vertical orientation of the gas springs exerts more vertical force and will support a higher load.

Various advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
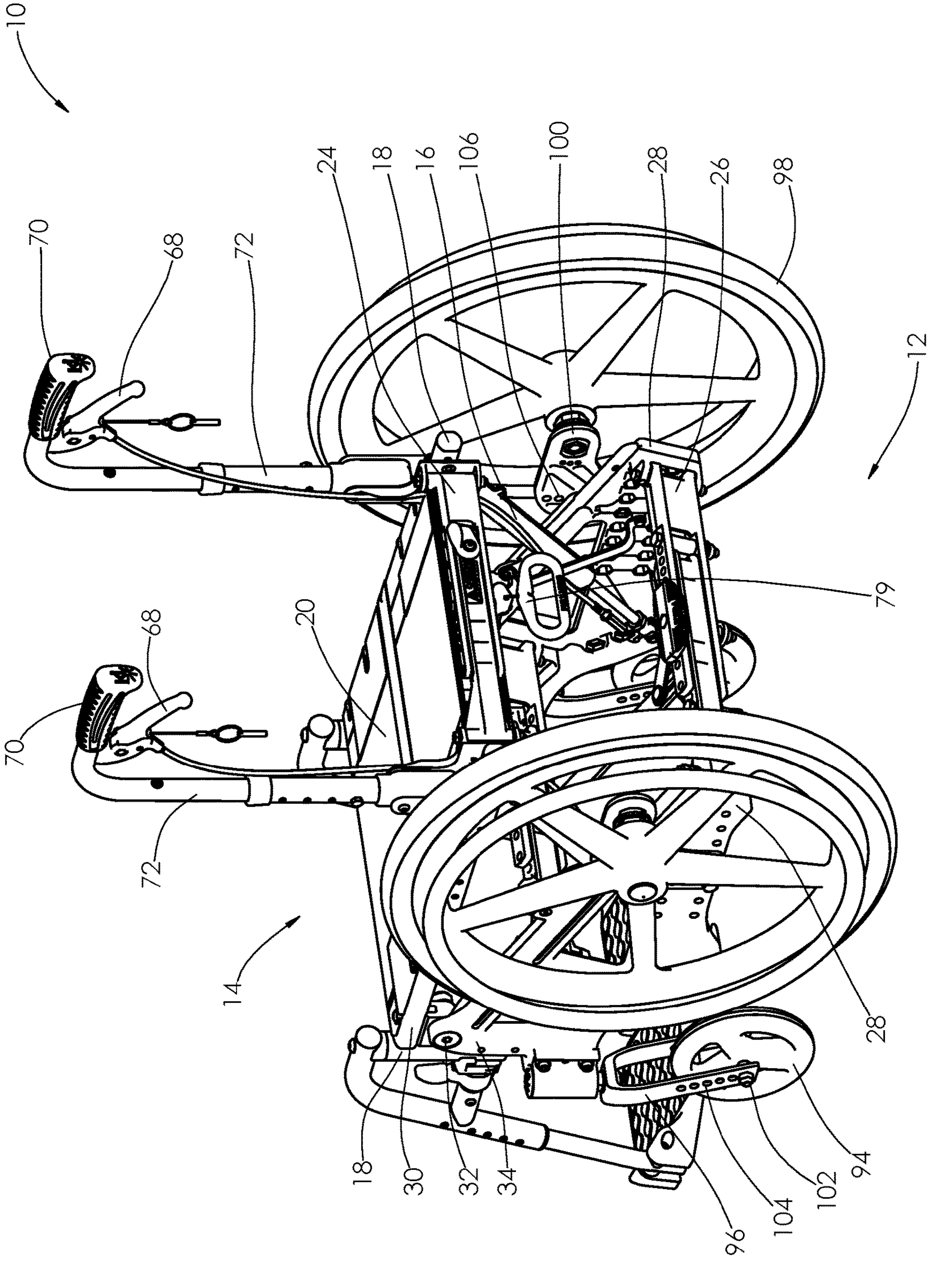
FIG. 1 is a rear perspective view of an exemplary foldable tiltable wheelchair.

Referring now to the drawings, there is illustrated in FIGS. 1-5 an exemplary wheelchair 10 configured with a foldable base frame 12 to support a tiltable seat frame 14 via a pair of locking gas springs 16, which are supported to provide increased stability. It should be appreciated that the wheelchair has opposing sides with component parts or features on one side that are the same or substantially the same as the other side. In some instances, the description refers to components parts or features on one side of the wheelchair. However, it should be clear that the components parts or features may be present on the other side as well.

The seat frame 14 comprises two longitudinal seat rails 18. A seat sling 20 is connected to the seat rails 18. Foldable cross-members 22, 24, 26 (shown in FIGS. 3 and 5) are connected between side frames 28. The foldable cross-members 22, 24, 26 provide a rigid connection between the side frames 28 when in a non-folded position. A front end 30 of the seat rails 18 is pivotally connected to a respective side frame 28 at pivot points 32 near the front end 34 of each side frame 28 (shown in FIGS. 1 and 3). A rear end 36 (shown in FIG. 3) of the seat frame 14 is connected to the side frames 28 via the locking gas springs 16. The locking gas springs 16 permit adjustment of the angle of the seat frame 14, aid in tilting/recovering the user of the wheelchair 10 throughout a range of angles of the seat frame 14, and provide lateral support for incidental lateral loading.

The close proximity of the pivot points 32 near the front end 30 of each seat rail 18 to the front end 34 of respective side frames 28 results in minimal rise in the user's knee level while tilting through the full range of angle adjustment of the seat frame 14. This allows for better maneuverability, particularly under tables and counters, and maintains ability for foot propulsion while the seat frame 14 is tilted.

Figure 2:
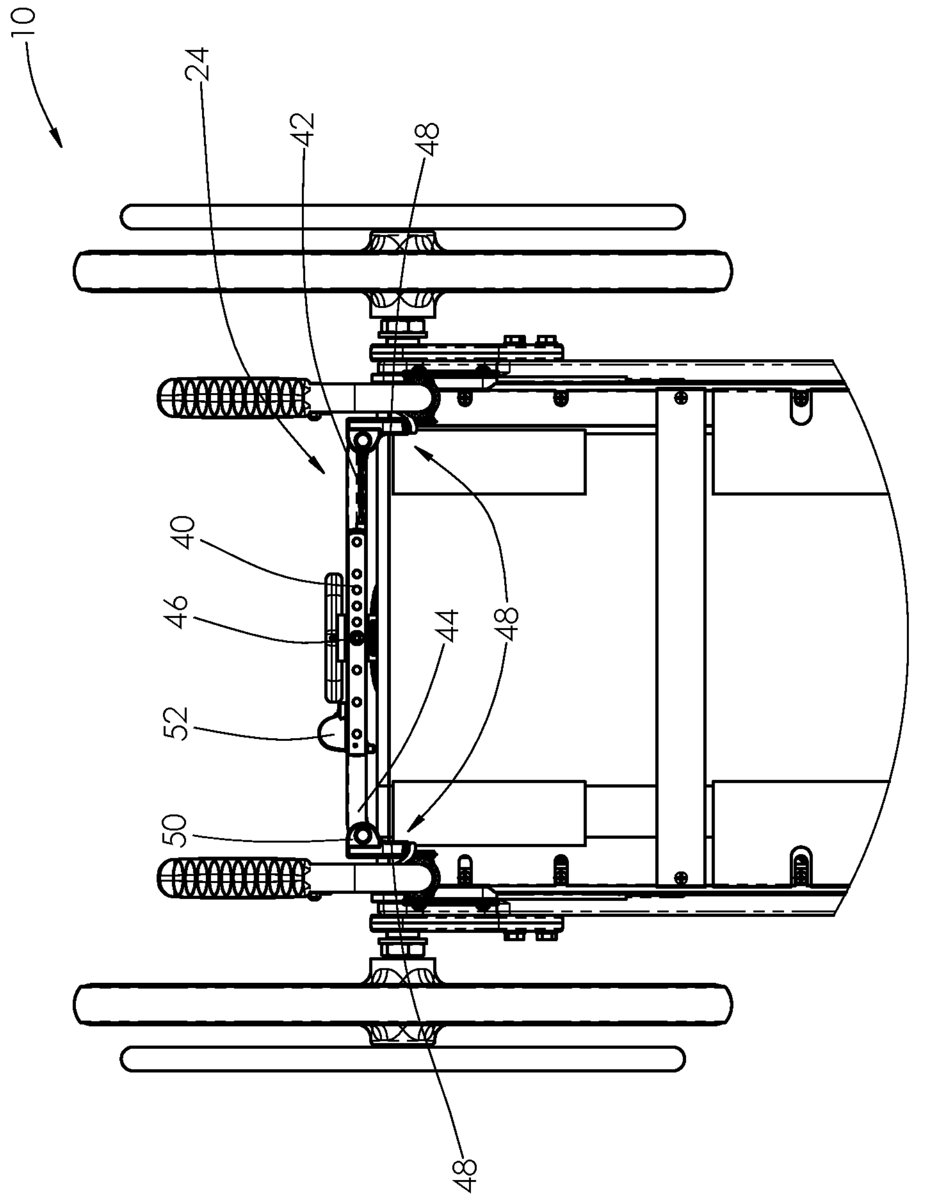
FIG. 2 is a partial top plan view of the foldable tiltable wheelchair shown in FIG. 1.

A rear foldable cross-member 24 provides rigidity to the rear of the seat frame 14, which prevents a lateral distance between a rear end 36 of the seat rails 18 from becoming significantly different than a lateral distance between the front end 30 of the seat rails 18. The rear foldable cross-member 24 also provides added rigidity to hold the two seat rails 18 in a substantially parallel relation to one another (i.e., from being at an excessively different in angle from one another). As shown in FIG. 2, the rear foldable cross-member 24 has a plurality of holes 40 to allow the wheelchair 10 to be adjusted for various seat widths. This is accomplished by aligning different holes of a first portion 42 of the rear foldable cross-member 24 with holes of a second portion 44 of the rear foldable cross-member 24, and fastening the two portions 42, 44 together with a pin or screw 46 at a sufficiently centralized location on the rear foldable cross-member 24 that the first and second portions 42, 44 of the rear foldable cross-member 24 pivot about the pin or screw 46 when folding the wheelchair 10. The first and second portions 42, 44 of the rear foldable cross-member 24 are connected to the seat frame 14 using mounting plates 48 with clevis tabs 50 to allow the first and second portions 42, 44 of the rear foldable cross-member 24 to rotate. The rear foldable cross-member 24 may be held in the non-folded position by having the first and second portions 42, 44 of the rear foldable cross-member 24 over center, by a mechanical lock 52, or both.

Figure 3:
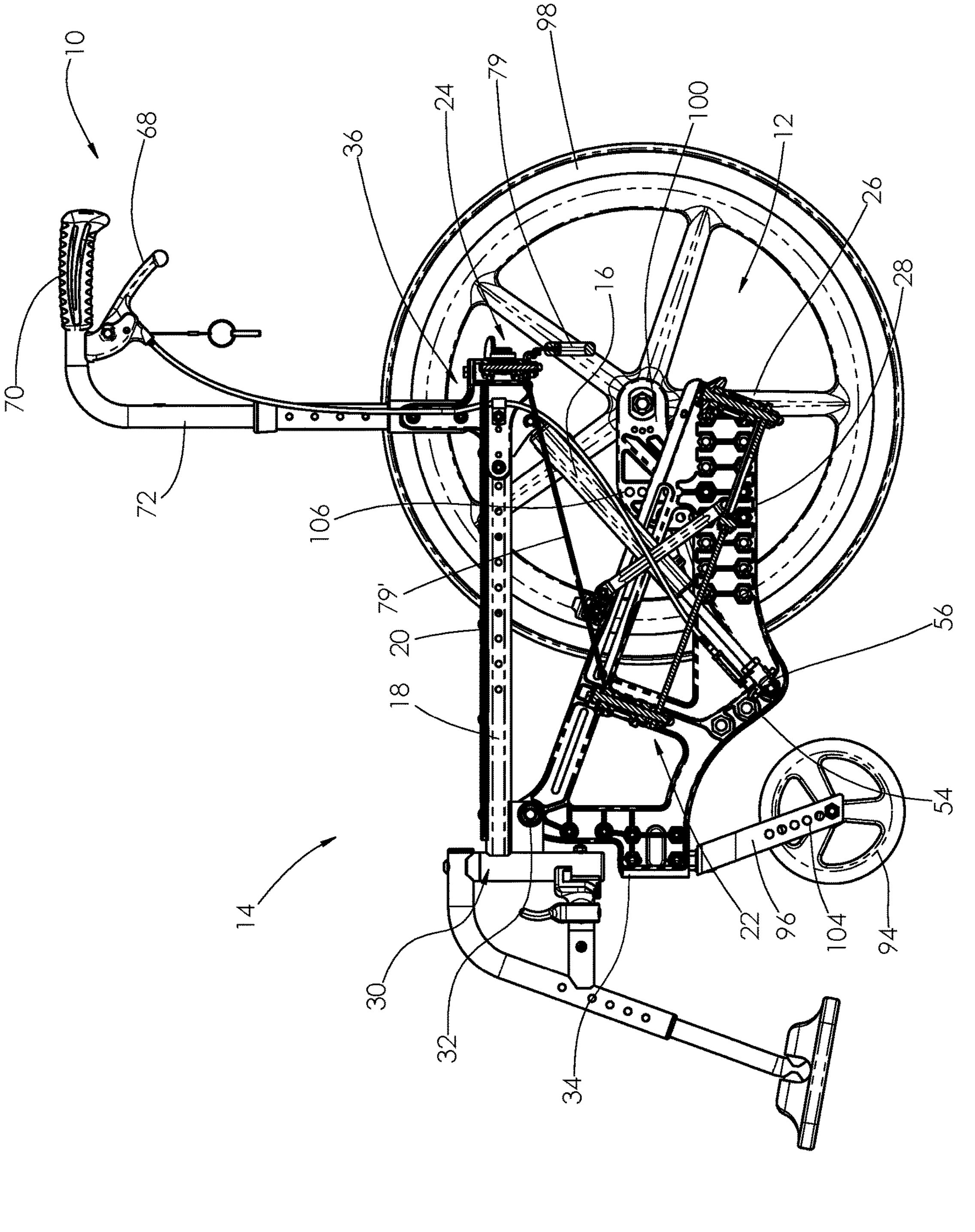
FIG. 3 is a sectional view of the foldable tiltable wheelchair shown in FIG. 1.
Figure 4:
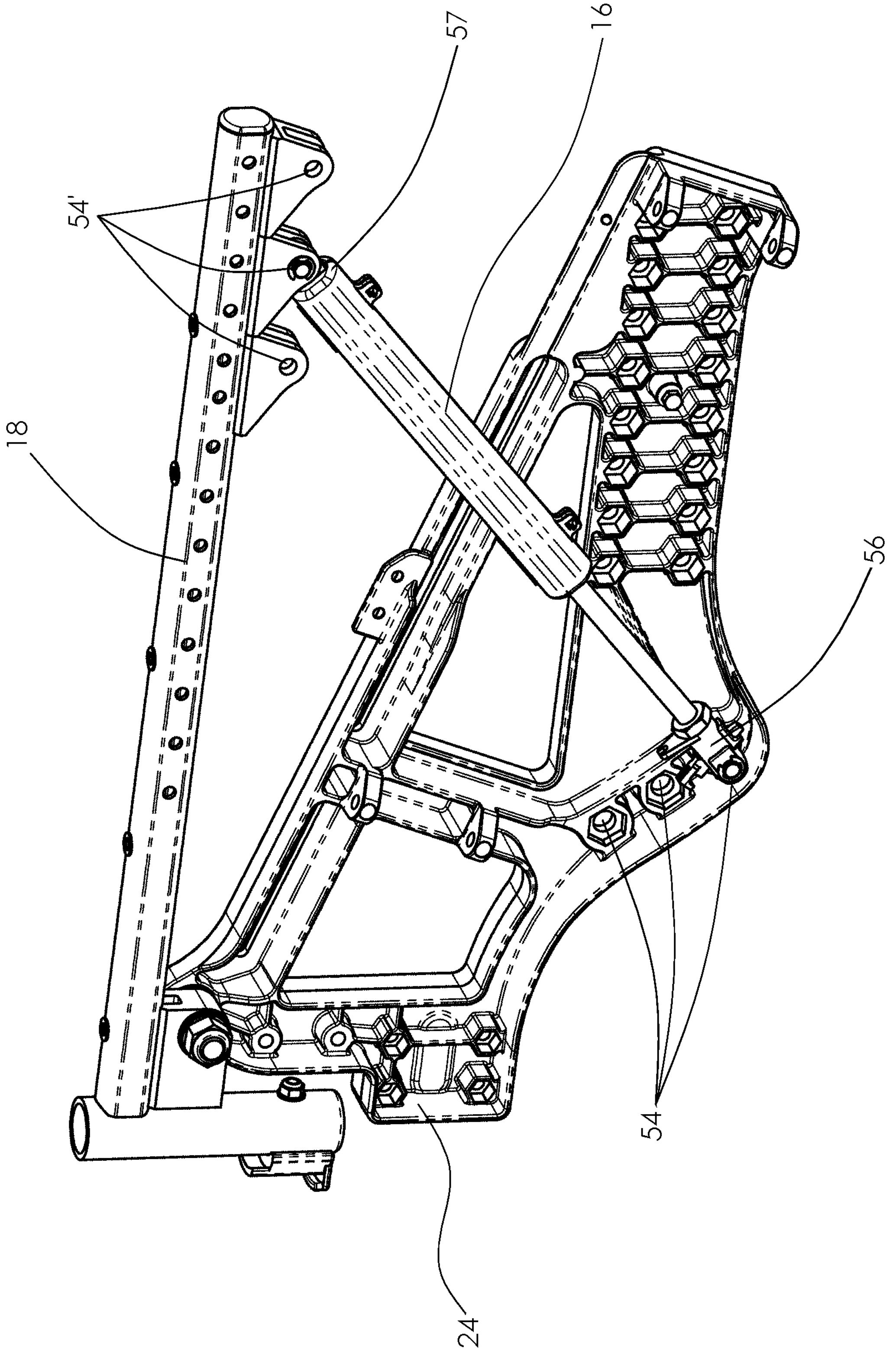
FIG. 4 is a partial side view of the foldable tiltable wheelchair shown in FIG. 1, showing adjustment holes for a locking gas spring supported in relation to a side frame and seat rail of the wheelchair.

The locking gas springs 16 provide vertical support to the seat frame 14 and provide angle adjustment of the seat frame 14. As shown in FIG. 3, a plurality of adjustment holes 54 are supported in relation to the side frame 28 for the attachment of a lower end 56 of the locking gas springs 16. The amount of rotational force that the locking gas springs 16 apply to the seat rails 18 can be adjusted by altering the lower attachment point of the locking gas spring 16 on the side frames 28, which changes the angle between the locking gas spring 16 and the seat rail 18, which, in turn, alters the amount of mechanical advantage the locking gas spring 16 has when applying force to the seat rails 18. This allows the tilting/recovering force to be fine-tuned, to optimize force for occupants of different weights. It should be understood that a plurality of adjustment holes 54' may be supported in relation to the seat rail 18 for attachment of the upper end 57 of the locking gas springs 16, or holes 54, 54' may be supported in relation to the side frame 28 and the seat rail 18 for attachment of both ends 56, 57 of the locking gas springs 16, as should in FIG. 4.

Figure 5:
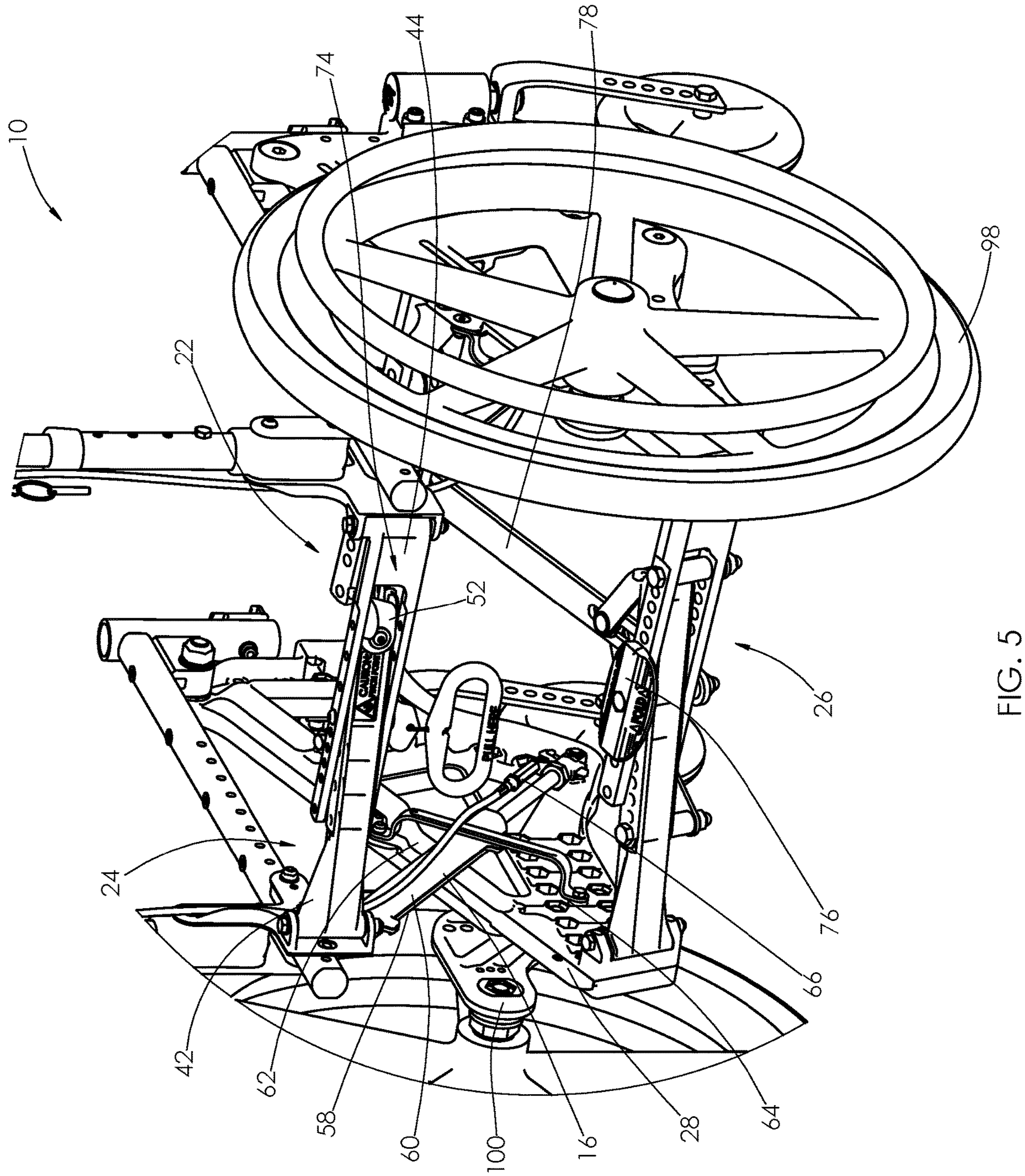
FIG. 5 is an enlarged partial rear perspective view of the foldable tiltable wheelchair shown in FIG. 1, showing more clearly foldable cross-members.

The locking gas springs 16 also provide lateral rigidity of the seat frame 14 relative to the side frames 28 by using an outer surface 58 of a body or cover 60 of the locking gas spring 16 as a first guide surface, as shown in FIG. 5, to minimize lateral motion when subjected to incidental lateral forces. The locking gas springs 16 are in close proximity to a second guide surface 62 that is in a fixed lateral position relative to the side frames 28 to permit minimal lateral motion of the locking gas springs 16. Additionally, a capturing bracket 64 on the opposite side of the locking gas spring 16 may be used for an additional support/constraint for the locking gas springs 16. Exemplary capturing brackets 64 are in the form of C-shaped brackets having opposing ends connected to respective side frames 14. The locking gas springs 16 are captured in a space bounded by the C-shaped brackets, while the locking gas springs 16 can travel in the space as the locking gas springs 16 move to raise and lower the seat frame 14.

It should be appreciated that the locking gas springs 16 may be controlled in any suitable manner. For example, the locking gas springs 16 may be actuated by cables 66 (shown in FIG. 5), which are controlled by triggers 68 positioned adjacent to handles 70 atop seat back tubes 72 of the wheelchair 10 (shown in FIG. 1), to allow an attendant to easily control the tilting of the seat frame 14. Controlling the locking gas springs 16 in this manner is well known to those of ordinary skill in the art.

The foldable cross-members 22, 24, 26 are more clearly shown in FIG. 5. In FIG. 1, the foldable cross-members 22, 24, 26 are shown in a non-folded position. The rear foldable cross-member 24 is held in the non-folded position by the rotatable mechanical lock 52. With the rear foldable cross-member 24 held in the non-folded position, the remaining foldable cross-members 22, 26 will likewise be held in the non-foldable position. To fold the wheelchair 10, the mechanical lock 52 can be rotated (i.e., in a clockwise direction when viewing FIG. 5) to clear an opening 74 in the second portion 44 of the rear foldable cross-member 24. This allows an end of the first portion 42 of the rear foldable cross-member 24 to pass through the opening 74. Simultaneously, all three foldable cross-members 22, 24, 26 (i.e., front, rear and lower foldable cross-members) will fold (i.e., in a forward direction when viewing FIG. 5). To aid in folding the wheelchair 10, a foot plate 76 is provided, which when pushed by an attendant (i.e., in a forward direction when viewing FIG. 5), urges the lower foldable cross-member 26 in a folded position. A lower link 78 connecting the lower foldable cross-member 26 to the front foldable cross-member 22 simultaneously urges the front foldable cross-member 22 in a folded position. The rear foldable cross-member 24 follows. To unfold the wheelchair 10, the foldable cross-members 22, 24, 26 are unfolded (i.e., in a rear direction when viewing FIG. 5) until the end of the first portion 42 of the rear foldable cross-member 24 passes through the opening 74 in the second portion 44. To aid in unfolding the wheelchair 10, a handle 79 is provided and an upper link 79' is connected to the handle 79. Pulling the handle 79 rearwardly (i.e., to the right when viewing FIG. 3), the upper link 79' is pulled rearwardly. This, in turn, pulls the front foldable cross-member 22 rearwardly to an unfolded position. The lower foldable cross-member 26 is urged rearwardly by the lower link 78. The rear foldable cross-member 24 is held in the non-folded position by rotating the rotatable mechanical lock 52 (i.e., in a counter-clockwise direction when viewing FIG. 5) to a locked position.

It should be appreciated that the links 78, 79' may be rigid links, or resilient or pliable links. Moreover, the links 78, 79' may be adjustable. For example, the upper link 79' may be a pliable strap, formed from or supporting a fastening structure, such as a hook and loop type fastening structure. Such a structure is distributed under the name VELCRO, which is a registered trademark of Velcro Industries B.V., private limited liability company of the Netherlands, Castorweg 22-24 Curacao. The strap passes through the front foldable cross-member 22 and attaches to itself. The strap (i.e., the upper link 79') is adjustable to accommodate adjustments in the depth of the seat 20, which is accommodated by adjusting the seat frame tubes 18 in relation to the rear end 36 of the seat frame 14.

Figure 6:
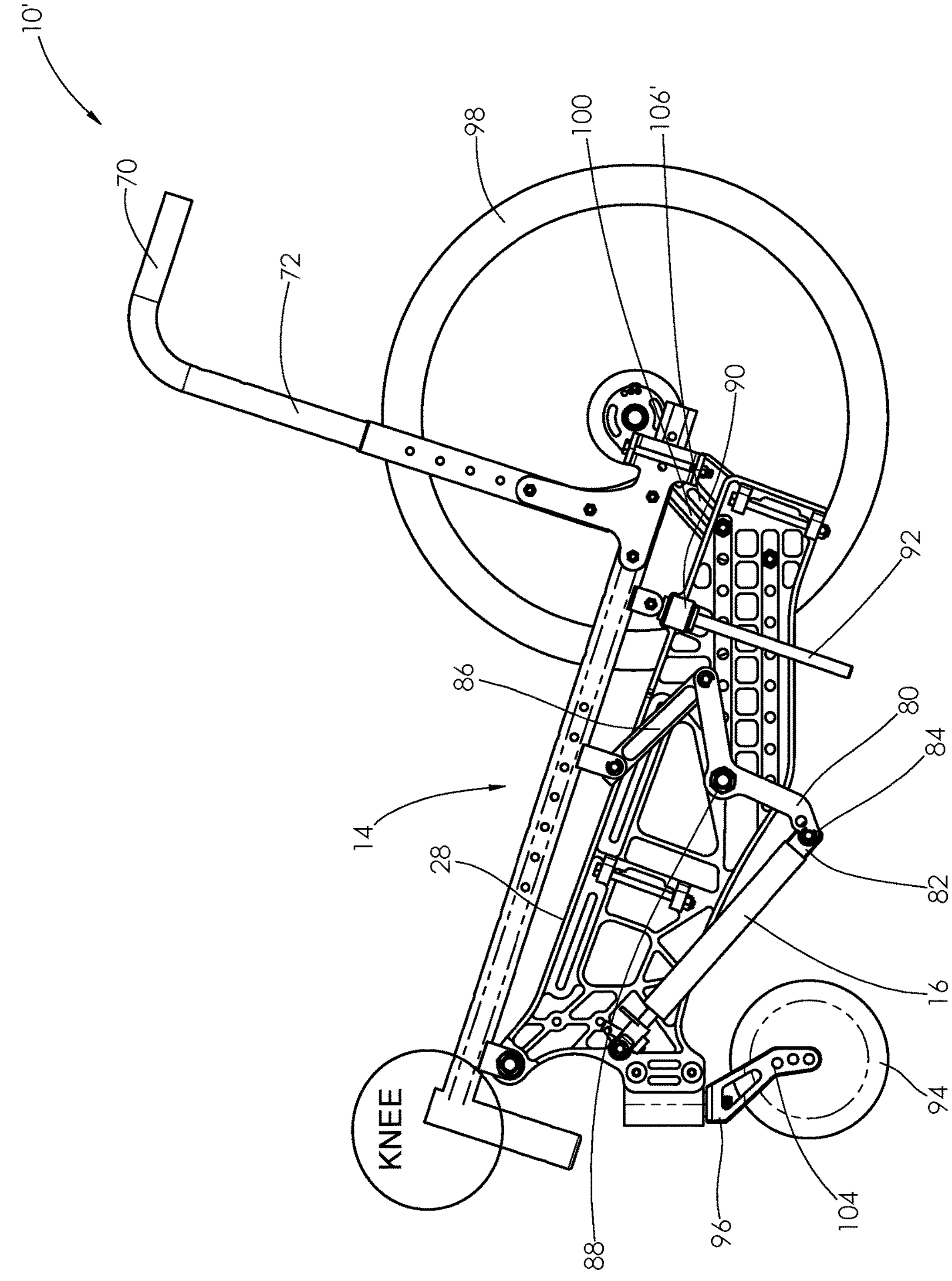
FIG. 6 is a partial side elevational view of an exemplary foldable tiltable wheelchair with portions of the wheelchair removed to show alternative seat frame tilt and lateral stability configurations.
Figure 7:
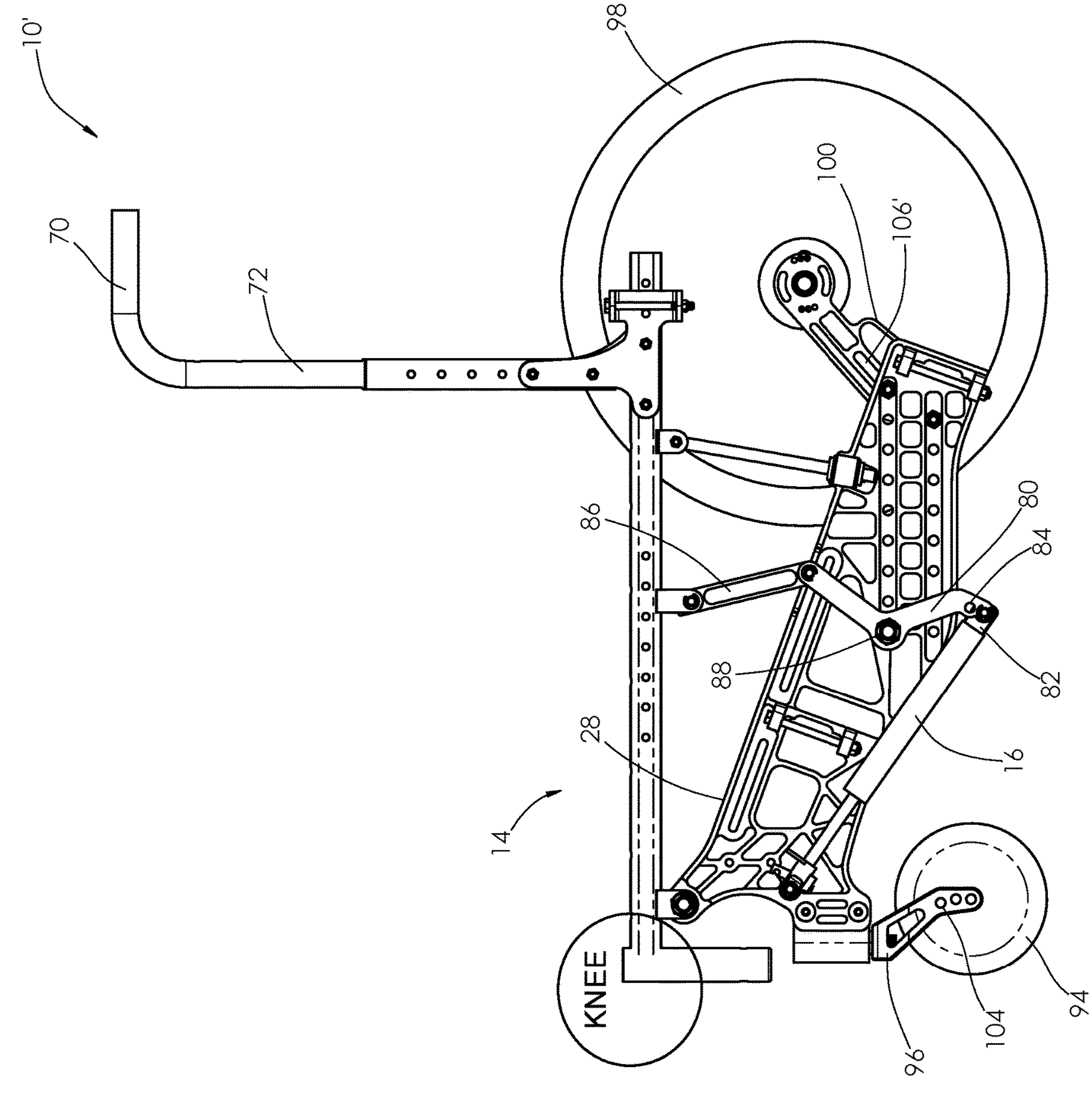
FIG. 7 is a side elevational view of the wheelchair shown in FIG. 6, with a seat frame thereof in a raised position.

An exemplary wheelchair 10' with an alternative seat frame tilt configuration is shown in FIG. 6. The tilt configuration comprises a linkage arrangement comprising a fulcrum 80 connected to a first end 82 of the locking gas spring 16. The fulcrum 80 may be positioned at one of a plurality of leverage points 84 to adjust lifting force of the locking gas spring 16 to accommodate different user weights. Although two leverage points 84 are shown in the drawing, additional leverage points may be provided. The fulcrum 80 is connected to the seat frame 14 by a linkage 86. In FIG. 6, the locking gas spring 16 is completely retracted, the seat frame 14 is reclined about 20 degrees. As the locking gas spring 16 extends, the fulcrum 80 pivots about a medially positioned pivot 88 (i.e., in a counter-clockwise direction when viewing FIG. 7) to drive the linkage 86 to raise the seat frame 14 (e.g., to a neutral position), as shown in FIG. 7. As stated above, the locking gas springs 16 may be actuated by cables controlled by triggers mounted adjacent to handles 70 atop seat back tubes 72, allowing an attendant to easily control the tilting of the seat frame 14.

As shown in the drawings, lateral stability of the seat frame 14 may alternatively be controlled by linear support bearings 90 and rods 92 connecting opposing sides of the seat frame 14 to respective side frames 28. The linear support bearings 90 are connected to the side frames 28 and the rods 92 are pivotally connected to respective seat frame tubes 18. The rods 92 translate through the linear support bearings 90 to provide lateral support to side loads while allowing tiling operation of the wheelchair 10 throughout the range of tilt of the seat frame 14.

The front end of the wheelchair 10, 10' is supported in relation to a supporting surface by caster wheels 94 supported by caster forks 96 that swivel in relation to the front end of the base frame 12 so as to be steerable in relation to the base frame 12, and thus permit the wheelchair 10, 10' to be steered. The rear end of the wheelchair 10, 10' is supported in relation to the supporting surface by drive wheels 98 supported by mounting brackets 100 that are supported in relation to the rear end of the base frame 12, whereby rotation of the drive wheels 98 against the supporting surface propels the wheelchair 10, 10'.

It should be appreciated that the caster wheels 94 may be adjusted in relation to the caster forks 96 (i.e., in a vertical direction when viewing the drawings), for example, via a fastener 102 (shown in FIG. 1) that cooperates with any one of a plurality of adjustment holes 104 in the caster forks 96 to adjust the height of the front end of the base frame 12, and thus, the front end 30 of the seat rails 18, in relation to the supporting surface. The drive wheels 98 likewise may be adjusted in relation to the rear end of the base frame 12, for example, via adjustment holes or a slot 106, 106' in the mounting bracket 100 to adjust the height of the rear end of the base frame 12 in relation to the supporting surface. Wheel adjustment permits the seat frame height to be adjusted to accommodate various users.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A foldable tiltable wheelchair comprising:

a base frame comprising first and second side frames each having a front end;

wheels supported in relation to the base frame for supporting the base frame for movement in relation to a supporting surface;

at least a first hinged foldable cross-member connecting the side frames, the first hinged foldable cross-member comprising first and second portions each having a first end connected for pivotal movement to the first and second side frames, respectively, and being movable in a forward direction and a rearward direction of the wheelchair;

a seat frame comprising first and second seat rails that provide a structure for supporting a seat, the first and second seat rails each having a front end connected for pivotal movement to the front end of the first and second side frames of the base frame, respectively, so that the seat frame is tiltable in relation to the base frame, the front end of the first and second seat rails being connected to the front end of the first and second side frames to minimize rise in a user's knee level when tilting the seat frame in relation to the base frame;

first and second locking gas springs operatively connected between the first and second side frames and the first and second seat rails, respectively, the first and second locking gas springs providing lateral support for the first and second seat rails in relation to the first and second side frames, respectively, the first and second locking gas springs further providing vertical support to the seat frame in relation to the base frame.

2. The wheelchair of claim 1, wherein the force by the locking gas springs applied to the seat rails is adjustable by altering a leverage point of the locking gas springs in relation to at least one of the side frames or the seat rails, which alters a mechanical advantage of the locking gas springs.

3. The wheelchair of claim 1, wherein the locking gas springs are connectable to the seat rails at one of a plurality of points to adjust the force applied by the locking gas springs to accommodate different user weights.

4. The wheelchair of claim 1, further comprising a second hinged foldable cross-member connected to the first and second seat rails, the first and second seat rails being connected in relation to first and second seat back tubes, respectively, to provide lateral stiffness for the seat back tubes and to prevent axial rotation of the seat rails.

5. The wheelchair of claim 4, wherein the cross-members are width-adjustable.

6. The wheelchair of claim 5, wherein the cross-members each comprise a first portion having a plurality of holes and a second portion having a plurality of holes, wherein the first portion is nestable within the second portion, and wherein at least one of the plurality of holes in the first portion aligns with at least one of the plurality of holes in the second portion at a point that is centralized between the side frames, and wherein a fastener is inserted in the aligned holes to function as a pivot point for the cross-members.

7. The wheelchair of claim 4, further comprising a rotatable mechanical lock, wherein the second hinged foldable cross-member comprises a first portion and a second portion, the second portion having an opening therein, wherein the rotatable mechanical lock is rotatable to a first position to allow the first portion to pass through the opening and thus allow the second hinged foldable cross-member to fold, and wherein the rotatable mechanical lock is rotatable to a second position to prevent the first portion from passing through the opening and thus prevent the second hinged foldable cross-member from folding.

8. The wheelchair of claim 4, further comprising at least one link extending between the first and second hinged foldable cross-members, wherein the link causes movement of one of the cross-members to effect movement of the other one of the cross-members.

9. The wheelchair of claim 8, wherein the link is adjustable to accommodate adjustments in a depth of the seat.

10. The wheelchair of claim 9, wherein the link is a pliable strap formed from or supporting a hook and loop type fastening structure, and wherein a first portion of the strap passes through the first foldable cross-member and attaches to a second portion of the strap.

11. The wheelchair of claim 1, further comprising lateral support structure supported in relation to the base frame and cooperating with the locking gas springs for constraining the first and second seat rails against lateral movement in relation to the first and second side frames, respectively.

12. The wheelchair of claim 1, further comprising lateral support structure that comprises a first guide surface defined by an outer surface of a cover of the locking gas springs and a second guide surface defined by an inner surface of the side frames, wherein the first guide surface engages the second guide surface to minimize lateral movement of the first and second seat rails in relation to the first and second side frames.

13. The wheelchair of claim 11, wherein the lateral support structure comprises first and second brackets connected to the first and second side frames, respectively, the locking gas springs being captured in a space bounded by between the brackets and an inner surface of the side frames, while the locking gas springs travel in the space as the locking gas springs move as the seat frame is tilted to minimize lateral movement of the first and second seat rails in relation to the first and second side frames.

14. The wheelchair of claim 11, the lateral support structure comprises:

first and second linear support bearings connected to the first and second side frames, respectively, and first and second rods pivotally connected to the first and second seat rails, respectively, where the rods translate through the linear support bearings to minimize lateral movement of the first and second seat rails in relation to the first and second side frames.

15. A foldable tiltable wheelchair comprising:

a base frame comprising first and second side frames;

at least a first hinged foldable cross-member connecting the side frames;

a seat frame supported for pivotal movement in relation to a forward portion of the base frame so that the seat frame is tiltable in relation to the base frame, the seat frame having first and second seat rails;

first and second locking gas springs operatively connected between the first and second side frames and the first and second seat rails, respectively wherein the locking gas springs are operatively connected between the side frames and the seat rails by linkage arrangements comprising:

first and second fulcrums connected to an end of the first and second locking gas springs, respectively, each of the first and second fulcrums pivots about a medially positioned pivot, and first and second linkages connecting the first and second fulcrums to the first and second seat rails, respectively, and wherein as the locking gas springs extend, the fulcrums pivot about the medially positioned pivots to drive the linkages to raise the seat frame.

16. A foldable tiltable wheelchair comprising:

a base frame comprising first and second side frames each having a front end;

wheels supported in relation to the base frame for supporting the base frame for movement in relation to a supporting surface;

a seat frame comprising first and second seat rails supporting a seat, the first and second seat rails that provide a structure for supporting a seat, the first and second seat rails each having a front end connected for pivotal movement to the front end of the first and second side frames, respectively, so that the seat frame is tiltable in relation to the side frames while minimizing rise in a user's knee level; and a first hinged foldable cross-member connecting the side frames, the first hinged foldable cross-member comprising first and second portions each having a first end connected for pivotal movement to the first and second side frames, respectively, and being movable in a forward direction and a rearward direction of the wheelchair;

a second hinged foldable cross-member connecting the seat rails, the second hinged foldable cross-member comprising first and second portions each having a first end connected for pivotal movement to the first and second seat rails, respectively, and being movable in a forward and rearward direction of the wheelchair;

first and second locking gas springs operatively connected between the first and second side frames and the first and second seat rails, respectively, the first and second locking gas springs providing lateral support for the first and second seat rails in relation to the first and second side frames, respectively, the first and second locking gas springs further providing vertical support to the seat frame in relation to the base frame, and lateral support structure constraining the first and second seat rails against lateral movement in relation to the first and second side frames, respectively.

17. The wheelchair of claim 16, wherein the force by the locking gas springs applied to the seat rails is adjustable by altering a leverage point of the locking gas springs in relation to at least one of the side frames or the seat rails, which alters a mechanical advantage of the locking gas springs.

18. The wheelchair of claim 16, wherein the locking gas springs are connectable to the seat rails at one of a plurality of leverage points to adjust the force applied by the locking gas springs to accommodate different user weights.

19. The wheelchair of claim 16, wherein the cross-members are width-adjustable.

20. The wheelchair of claim 19, wherein the cross-members each comprise a first portion having a plurality of holes and a second portion having a plurality of holes, wherein the first portion is nestable within the second portion, and wherein at least one of the plurality of holes in the first portion aligns with at least one of the plurality of holes in the second portion at a point that is centralized between the side frames, and wherein a fastener is inserted in the aligned holes to function as a pivot point for the cross-members.

21. The wheelchair of claim 16, further comprising a rotatable mechanical lock, wherein the second hinged foldable cross-member comprises a first portion and a second portion, the second portion having an opening therein, wherein the rotatable mechanical lock is rotatable to a first position to allow the first portion to pass through the opening and thus allow the second hinged foldable cross-member to fold, and wherein the rotatable mechanical lock is rotatable to a second position to prevent the first portion from passing through the opening and thus prevent the second hinged foldable cross-member from folding.

22. The wheelchair of claim 16, further comprising at least one link extending between the first and second hinged foldable cross-members, wherein the link causes movement of one of the cross-members to effect movement of the other one of the cross-members.

23. The wheelchair of claim 22, wherein the link is adjustable to accommodate adjustments in a depth of the seat.

24. The wheelchair of claim 23, wherein the link is a pliable strap formed from or supporting a hook and loop type fastening structure, and wherein a first portion of the strap passes through the first foldable cross-member and attaches to a second portion of the strap.

25. The wheelchair of claim 16, wherein the lateral support structure comprises a first guide surface defined by an outer surface of a cover of the locking gas springs and a second guide surface defined by an inner surface of the side frames, wherein the first guide surface engages the second guide surface to minimize lateral movement of the first and second seat rails in relation to the first and second side frames.

26. The wheelchair of claim 16, wherein the lateral support structure comprises first and second brackets connected to the first and second side frames, respectively, the locking gas springs being captured in a space bounded between the brackets and an inner surface of the side frames, while the locking gas springs travel in the space as the locking gas springs move as the seat frame is tilted to minimize lateral movement of the first and second seat rails in relation to the first and second side frames.

27. The wheelchair of claim 16, the lateral support structure comprises:

first and second linear support bearings connected to the first and second side frames, respectively, and first and second rods pivotally connected to the first and second seat rails, respectively, where the rods translate through the linear support bearings to minimize lateral movement of the first and second seat rails in relation to the first and second side frames.

28. A foldable tiltable wheelchair comprising:

a base frame comprising first and second side frames;

a seat frame supporting a seat and supported for pivotal movement in relation to a forward portion of the side frames so that the seat frame is tiltable in relation to the side frames, the seat frame having first and second seat rails; and a first hinged foldable cross-member (22) connecting the side frames;

a second hinged foldable cross-member (24) connecting the seat rails;

first and second locking gas springs operatively connected between the first and second side frames and the first and second seat rails, respectively, and lateral support structure (92) constraining the first and second seat rails against lateral movement in relation to the first and second side frames, respectively, wherein the locking gas springs are operatively connected between the side frames and the seat rails by linkage arrangements comprising:

first and second fulcrums connected to an end of the first and second locking gas spring, respectively, each of the first and second fulcrums pivots about a medially positioned pivot, and first and second linkages connecting the first and second fulcrums to the first and second seat rails, respectively, and wherein as the locking gas springs extend, the fulcrums pivot about the medially positioned pivots to drive the linkages to raise the seat frame.

29. A foldable tiltable wheelchair comprising:

a base frame comprising first and second side frames each having a front end;

wheels supported in relation to the base frame for supporting the base frame for movement in relation to a supporting surface;

a seat frame comprising first and second seat rails that provide a structure for supporting a seat, the first and second seat rails each having a front end connected for pivotal movement to the front end of the first and second side frames, respectively, so that the seat frame is tiltable in relation to the side frames while minimizing rise in a user's knee level; and a first hinged foldable cross-member hingedly connecting the side frames, the first hinged foldable cross-member comprising first and second portions each having a first end connected for pivotal movement to the first and second side frames respectively, and being movable in a forward direction and a rearward direction of the wheelchair;

a second hinged foldable cross-member hingedly connecting the seat rails, the second hinged foldable cross-member comprising first and second portions each having a first end connected for pivotal movement to the first and second seat rails, respectively, and being movable in a forward and rearward direction of the wheelchair;

at least a first locking gas spring operatively connected between the first side frame and the first seat rail, the first locking gas spring further providing vertical support to the seat frame in relation to the base frame; and lateral support structure constraining at least one of the first and second seat rails against lateral movement in relation to at least one of the first and second side frames, respectively.

30. The foldable tiltable wheelchair of claim 1, wherein the seat frame is supported for pivotal movement forward of the first hinged foldable cross-member.

31. The foldable tiltable wheelchair of claim 16, wherein the seat frame is supported for pivotal movement forward of the first hinged foldable cross-member.

32. The wheelchair of claim 29, wherein the seat frame is supported for pivotal movement forward of the first hinged foldable cross-member.

33. The wheelchair of claim 16, further comprising a second hinged foldable cross-member connected to the seat rails to provide stiffness between the seat rails and prevent the seat rails from moving rotationally independently of one another.

34. The wheelchair of claim 29, further comprising a second hinged foldable cross-member connected to the seat rails to provide stiffness between the seat rails and prevent the seat rails from moving rotationally independently of one another.

* * * * *